Patented Oct. 17, 1939

2,176,074

UNITED STATES PATENT OFFICE 2,176,074

POLYAMIDES

Ralph A. Jacobson, Wilmington, Del., assignor to E. I. du Pont de Nemours & Company, Wilmington, Del., a corporation of Delaware No Drawing. Application August 12, 1936, Serial No. 95,711

5 Claims. (Cl. 260—2)

This invention relates to polymeric materials and more particularly to new polyamides.

As disclosed in application Serial Number 548,701, filed July 3, 1931, by W. H. Carothers now Patent No. 2,071,250 and in its continuing applications Serial Numbers 180, and 181, filed January 2, 1935 now Patent Nos. 2,071,253 and 2,130,523, and 74,811, filed April 16, 1936, highly polymerized polyamides of unusual properties may be derived from polymerizable amino acids of the formula NH₂GCOOH, and from the reaction of diamines whose amino nitrogens each carries at least one hydrogen atom, particularly those of the formula NH₂G'NH₂, with dicarboxylic acids of the formula HOOCG"COOH, in which G, G' and G" are divalent hydrocarbon radicals. These polyamides are largely high-melting crystalline solids relatively insoluble in most organic solvents with the exception of phenols and certain acids. These products can generally be obtained in the form of super-polyamides, that is, products which can be spun into useful fibers.

I have now found when the reactant or reactants of the above mentioned type have a lateral substituent, as more fully described herein, that products are obtained which have properties not possessed by the polyamides heretofore known and which are adapted to new or additional uses in the arts.

This invention has an object the preparation of new and useful polymeric products. A still further object is the manufacture of products useful in the textile, plastic, molding, coating, sizing, adhesive, impregnating, and related arts. Other objects will appear hereinafter.

As indicated above, the polyamides of the present invention are made from a polyamide-forming material or materials containing a lateral substituent. Thus the polyamide may be made by polymerizing an amino acid such as 2-phenyl-mercapto-6-aminocaproic acid having the formula:

NH₂—CH₂CH₂CH₂CH₂—CH—CO₂H
                        |
                        S—C₆H₅ in which the lateral substituent is thiophenyl (—SC₆H₅).

When the polyamide is made from a diamine and a dibasic acid, a suitable diamine is 1,3-diaminopropanol-2 having the formula:

NH₂CH₂CHCH₂NH₂
         |
         OH in which the lateral substituent is hydroxyl (—OH). The dibasic acid may contain the lateral substituent instead of or in addition to the diamine, a suitable dibasic acid being α-N-dimethylaminopimelic acid having the formula:

HOOCCH₂CH₂CH₂CH₂CHCOOH
                    |
                    CH₃—N—CH₃ in which the lateral substituent is dimethylamino

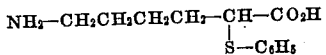

It will be seen, then, that the lateral substituent or lateral functional group represents a non-amide-forming group other than hydrocarbon, such as a group containing oxygen or sulfur (either alone or in combination with hydrogen or a hydrocarbon residue) or nitrogen free from replaceable hydrogen atoms

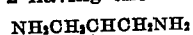

which is attached to but which does not interrupt the chain of atoms separating the amide-forming groups. The chain of atoms separating the amide-forming groups may, however, contain atoms other than carbon. The products of the present invention are therefore obtained from one or more reactants which provide interacting amide-forming carboxyl and amino groups, the amide-forming groups in at least one of the reactants being separated by a chain of at least two atoms to one of which is attached the lateral substituent. The reactive amino groups contained in the compounds used in making my new polyamides have at least one hydrogen atom attached to the nitrogen atom.

The objects of my invention are accomplished by heating to reaction temperature, generally from 100 to 300° C., in the presence or absence of a solvent or diluent, polyamide-forming reactants, at least one of which contains a lateral substituent, as defined above, in the chain of atoms separating the amide-forming groups, until a polymeric product is obtained. The term "polyamide-forming reactant" is used to designate any compound which, when heated alone or in admixture with a complementary polyamide-forming reactant, is capable of yielding a polyamide. It includes amino acids and its congeners (i. e., amide-forming derivatives of amino acids), diamines, and dicarboxylic acids and its congeners (i. e., amide-forming derivatives of dibasic carboxylic acids). Thus, in carrying out my invention, I heat to reaction temperature (preferably 150–300° C.) either a polymerizable monoamino-monocarboxylic acid (including amide-forming derivatives thereof) containing a lateral substituent, or substantially chemical equivalent amounts of a diamine (primary or secondary) and a dibasic acid or amide-forming derivative of a dibasic carboxylic acid, at least one of which contains a lateral functional group, to reaction temperature until a polymer of the desired properties is formed. Reaction may also be carried out in the presence of a solvent, a diluent which is a non-solvent for the polymer, or a mixture of solvent and diluent. By "amide-forming derivative of an acid" is meant an ester, acid halide, amide, or anhydride. I prefer to react diamines and dibasic acids in making my new products. The reaction is a condensation polymerization involving the removal of the by-product water, alcohol, phenol, hydrogen chloride, or ammonia, depending upon the amide-forming derivative of the acid used. In general, the products formed are linear condensation polymers, but in some cases further reaction (cross-linking) occurs through reaction of the lateral functional groups.

When the polyamide is prepared from a diamine and a dicarboxylic acid, the first reaction which occurs on bringing the reactants into sufficiently intimate contact is the formation of the diamine-dicarboxylic acid salt. It is often desirable to separate and purify this salt prior to its conversion into the polyamide. The salts are generally crystalline, are readily purified by crystallization in a suitable solvent, such as water or alcohol, and have definite melting points. Analytical data indicate that these salts are derived from the reaction of one mol of diamine with one mol of dicarboxylic acid. The preparation of the salts affords an automatic means of adjusting the amine and acid reactants to substantial equivalency and avoids the difficulties attendant upon the preservation of the isolated amines in the state of purity. The formation and purification of the salts also tends to eliminate impurities present in the original diamines and dibasic acids.

As already stated, the polyamides of this invention are made by heating the reactants at the temperatures required for amide formation. The heating may be carried out in an open or closed reactor under ordinary, reduced, or increased pressure. Usually it is desirable to carry out the reaction under conditions which permit the removal of the water or other by-product formed in the reaction. It is advantageous to carry out the reaction in the absence of air; the addition of an antioxidant is sometimes desirable. Generally, it is unnecessary to add a catalyst; however, inorganic substances of alkaline reaction, such as oxides and carbonates, and acid substances, such as halogen salts of polyvalent elements, e. g., aluminum, zinc, and tin, are sometimes helpful.

The following examples in which parts are given by weight illustrate the preparation of typical products of this invention:

Example I

*Polyamide from phoronic acid and decamethylenediamine*

An ethanol solution of 25 parts of phoronic acid, $$HOOCC(CH_3)_2CH_2COCH_2C(CH_3)_2CO_2H$$

was added to an ethanol solution of 18.8 parts of decamethylenediamine. This caused the precipitation of the diamine-dibasic acid salt. The air-dried salt was heated for one hour at 215°–225° C. under atmospheric pressure and then for two hours under reduced pressure (2 mm.). The polyamide thus formed was a clear, light amber-colored resin, soluble in benzene, butyl acetate, ethanol, dioxan, and the ethyl ether of ethylene glycol. It softened at about 45° C. (The softening point of this polyamide and those described in the succeeding examples was determined penetrometrically.) Films cast on glass from solutions of the resin were clear, tough, and had good adhesion.

Example II

*Polyamide from ethyl acetonedicarboxylate and decamethylenediamine*

Eighty-five parts of decamethylenediamine and 100 parts of the diethyl ester of acetonedicarboxylic acid, $C_2H_5OOCCH_2COCH_2COOC_2H_5$, were heated together as follows: 130° C./760 mm., 20 minutes; 130–190° C./760 mm., 40 minutes; 190° C./20 mm., 30 minutes. At the end of this time the reaction mixture gelled but was still soluble in a mixture of approximately equal volumes of ethanol and benzene. The resulting polyamide was a tough, horn-like, amber-colored resin. It had a softening point of about 30° C. Films formed by drying an alcohol-benzene solution of the polyamide at room temperature were very hard and tough.

Example III

*Polyamide from adipic acid and 1,3-diaminopropanol-2*

A mixture of 29.2 parts of adipic acid and 18 parts of 1,3-diaminopropanol-2 was heated for 0.5 hour at 220°C./760 mm. and then for 2.0 hours at 220°C./90 mm. The resulting polyamide was a light-yellow, clear, hard resin, which was soluble in water, slightly soluble in ethanol, and insoluble in benzene. It softened at about 65° C.

Example IV

*Polyamide from methoxy dimer of methyl methacrylate and hexamethylenediamine*

A solution of 5.8 parts of hexamethylenediamine in 40 parts of ethanol was heated with 11.6 parts of the methoxy dimer of methyl methacrylate for 1.0 hour up to 180° C., 1.5 hours at 180° C., 0.5 hour at 180–220° C., and finally for 1.0 hour at 220° C. The product was an amber-colored syrup which was soluble in ethanol and in benzene. The methoxy dimer of methyl methacrylate was prepared by the addition of methanol (using sodium methylate) to methyl methacrylate in the presence of benzoyl peroxide. Although the exact structure of this compound is not known, analytical data show that it is a dimethyl ester of a dicarboxylic acid containing a methoxy (ether) group, possibly $$CH_3OOCCH(CH_3)CH(OCH_3)CH_2CH(CH_3)COOCH_3$$

Example V

*Polyamide from thioglycollic acid, phorone, and decamethylenediamine*

Phorone (13.8 parts) and thioglycollic acid (29.3 parts) were mixed and allowed to stand about three weeks at room temperature, heated eight hours on the steam bath, and finally heated under 2 mm. absolute pressure at 165° C. to remove any unreacted materials. The product (bis-thioglycollic acid ether of phorone) was a heavy syrup. It was formed by the addition of two mols of the acid to one of phorone and probably has the structure.

HOOCCH₂SC(CH₃)₂CH₂COCH₂C(CH₃)₂SCH₂COOH

Nineteen parts of this material was heated with 10.6 parts of decamethylenediamine for 1.5 hours at 215–220° C. The resulting polyamide was a reddish-brown resin which was soluble in butyl acetate, ethanol-benzene mixtures, and in the ethyl ether of ethylene glycol. It was plastic at room temperature, and was useful in coating compositions.

In the examples cited no added solvent or diluent was used. The reaction can also be carried out in the presence of an inert solvent of which monohydric phenols, e. g., phenol, cresols, xylenols, and hydroxy diphenyls, are especially useful. Inert non-solvents such as hydrocarbons may be used. When easily volatile reactants are used, it is desirable to carry out at least the initial stage of the reaction in a closed vessel or under reflux to prevent loss of reactants. The products of this invention are conveniently prepared in an open reactor equipped with a reflux condenser which permits the water or other by-products of the reaction to escape but not the reactants or solvent. During the latter stages of the reaction, it is often desirable to decrease the pressure in order to complete the reaction and, if desired, to distill off the solvent. However, the products can be removed from the solvent by precipitation methods.

Examples I, II, and V illustrate polyamides derived from diamines and dicarboxylic acids or their amide-forming derivatives (esters) containing oxygen (in form of carbonyl group) as the lateral functional group. The acid (ester) used in Example V also contains the hetero-atom, sulfur in the chain. Examples III illustrates a polyamide derived from a dicarboxylic acid and a diamine containing the lateral functional group, hydroxyl, while Example IV discloses a polyamide containing a lateral functional group of the ether type.

In a similar manner the lateral substituents in the products may be furnished by other laterally substituted functional groups, e. g., thioether, tertiary amines, acetals, and thioacetal groups. As additional examples of dibasic acids (or amide-forming derivatives thereof) containing lateral functional groups may be mentioned tartaric acid, malic acid, mucic acid, ethoxy-succinic acid, diketosebacic acid, benzophenone dicarboxylic acid, and acids of the type

HOOCCHCH₂CH₂CHCOOH
   |                |
   N(CH₃)₂    N(CH₃)₂

These acids or their amide-forming derivatives may be condensed with diamines of which the following are illustrative: ethylenediamine, tetramethylenediamine, pentamethylenediamine, hexamethylenediamine, octamethylenediamine, decamethylenediamine, p-xylylenediamine, and beta,beta′ diaminodiethyl ether. The products of this invention can also be prepared by reacting diamines containing lateral functional groups, e. g., 1,3-diaminopropanol-2, 1,3-diamino-2-mercaptopropane, and 1,2-diaminomethyl dioxane

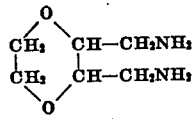

with dibasic acids, such as carbonic, oxalic, maleic, glutaric, adipic, beta-methyl adipic, pimelic, suberic, azelaic, sebacic, p-phenylene diacetic, diglycollic acid, and diphenylolpropane diacetic acid. As examples of amino acids containing laterally substituted groups which may be used in the preparation of the products of this invention may be mentioned

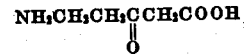

and

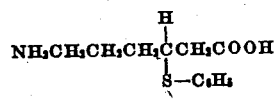

It will be seen from the above description that many combinations of reactants are possible in the preparation of the polyamides of this invention. Further combinations are possible by reacting one or more diamines with one or more dicarboxylic acids, at least one of which contains a lateral functional group. Similarly, interpolymers can be prepared from the reaction of one or more monoaminomonocarboxylic acids with diamine-dibasic acid mixtures in which at least one reactant contains a lateral functional group. Moreover, it is within the scope of this invention to mix preformed polyamides at least one of which is derived from a polyamide-forming reactant containing a lateral functional group. Products of this invention can also be mixed with other polymers, e. g., with the fiber-forming polymers described in the previously mentioned applications. Thus, it is possible to add substantial amounts of a polyamide containing a lateral functional group to a superpolyamide, e. g., polyhexamethylene adipamide, and obtain a product whose properties closely resemble that of the unmodified superpolyamide; the mixed polymer can be spun from melt into filaments capable of being cold-drawn into oriented fibers.

The polyamides made according to the practice outlined above all contain at least one lateral substituent which appears in the divalent, organic radicals separating the recurring amide groups in the polymer molecules. The position of the lateral substituent and the order and frequency of its occurrence in the polymer molecule are dependent upon the reactants used in the preparation of the polymer. If the polyamide is obtained exclusively from a polymerizable monoaminomonocarboxylic acid, NH₂RCOOH, in which R is a divalent organic radical having a lateral substituent inserted along the chain of carbon atoms separating the amino and carboxyl groups, then this substituent will be present in each recurring unit (—NHRCO—) in the polyamide. If the polymer is derived from a mixture of polymerizable amino acids only one of which contains a lateral substituent, the said substituent will of course appear less frequently in the polymer molecule.

In the case of the polyamides made from diamines and dicarboxylic acids, it will be apparent that several types of polyamides containing lateral functional groups can be prepared. For example, those in which the diamine (NH₂R′NH₂) represented contains a lateral substituent, those in which the dibasic acid (HOOCR″COOH) contains a lateral substituent, and those in which both the amine and acid contain a lateral substituent. In the formulae R′ and R″ represent divalent organic radicals containing a lateral substituent inserted along the chain of carbon atoms separating the amide-forming group, that is, the amino and carboxyl groups. Still further combinations are possible by using diamines and dibasic acids free from lateral substituents along with diamines and/or dibasic acids containing lateral substituents. It is also possible to use polymerizable amino acids in conjunction with a diamine and a dibasic acid, providing at least one of said reactants contains a lateral substituent. It is evident therefore that at least one of the reactants used in the preparation of the products of this invention has the formula XR'''Y, in which X and Y represent amino or carboxyl groups and R''' represents a divalent organic radical containing a lateral functional group in the chain of atoms separating X and Y. On hydrolysis with strong mineral acids the products of this invention, except those of the heat hardening type, generally yield the reactants from which they were derived, the amino constituents being obtained in the form of their mineral acid salts.

The products of the present invention are for the most part resinous and unlike the polymers described in the previously identified applications are soluble in a large number of common organic solvents and are therefore better adapted to the preparation of coating, impregnating, sizing, adhesive, and molding compositions than are the known polyamides made from reactants which do not contain a lateral substituent. The products of this invention may also be used in the preparation of fibers, but for this purpose it is generally desirable to prepare the products in the presence of polyamide-forming reactants which yield superpolymers, or to incorporate these products with a fiber-forming ingredient, such as a cellulose derivative or a fiber-forming polymer of the kind described in the above mentioned application.

The softening temperature and solubility characteristics of the resinous polyamides described herein are dependent somewhat upon the reactants from which they are prepared. In general, they are soluble in such solvents as alcohols, esters, monoethers of ethylene glycol, dioxan, and alcohol-aromatic hydrocarbon mixtures. For the most part they have good compatibility characteristics and can be mixed with drying oils, various resins, cellulose derivatives, plasticizers and other ingredients which are used in the preparation of coatings and plastic compositions. Some of the products of this invention owing to the reactivity of the lateral substituent are of the heat-hardening type, i. e., they can be converted by heating into insoluble products.

As many apparently widely different embodiments of this invention may be made without departing from the spirit and scope thereof, it is to be understood that I do not limit myself to the specific embodiments thereof except as defined in the appended claims.

I claim:

1. A polyamide consisting of the reaction product of substantially solely bifunctional polyamide-forming reactants at least one of which contains a lateral substituent in the chain of atoms separating the amide-forming groups, said amide-forming groups being attached to aliphatic carbon atoms, and said lateral substituent being one selected from the class consisting of ether and thioether groups.

2. A polyamide consisting of the reaction product obtained by heating as substantially the sole reactant a compound of the class consisting of polymerizable monoaminomonocarboxylic acids of the formula $NH_2RCOOH$ in which the amide-forming groups are attached to aliphatic carbon atoms, and amide-forming derivatives thereof containing the carbonyl group of the carboxyl group, in which R is a divalent organic radical having a chain of atoms to which is attached a lateral substituent selected from the class consisting of ether and thioether groups.

3. A polyamide consisting of the reaction product of reactants consisting substantially solely of a diamine of the formula $NH_2R'NH_2$ in which the amino groups are attached to aliphatic carbon atoms and a compound of the class consisting of dibasic acids of the formula $HOOCR''COOH$, and amide-forming derivatives thereof containing the carbonyl group of the carboxyl group, wherein R' and R'' are divalent organic radicals at least one of which has a chain of atoms to which is attached a lateral substituent selected from the class consisting of ether and thioether groups.

4. A process which comprises heating to reaction temperature until a polymeric product is obtained reactants consisting substantially solely of a compound of the class consisting of polymerizable monoaminomonocarboxylic acids of the formula $NH_2RCOOH$ in which the amide-forming groups are attached to aliphatic carbon atoms, and amide-forming derivatives thereof containing the carbonyl group of the carboxyl group, where R is a divalent organic radical having a chain of atoms to which is attached a lateral substituent selected from the class consisting of ether and thioether groups.

5. A process which comprises heating to reaction temperature until a polymeric product is obtained reactants consisting substantially solely of a diamine of the formula $NH_2R'NH_2$ in which the amino groups are attached to aliphatic carbon atoms and a compound of the class consisting of dibasic acids of the formula $HOOCR''COOH$, and amide-forming derivatives thereof containing the carbonyl group of the carboxyl group, wherein R' and R'' are divalent organic radicals at least one of which has a chain of atoms to which is attached a lateral substituent selected from the class consisting of ether and thioether groups.

RALPH A. JACOBSON.